United States Patent [19]

Rogers

[11] Patent Number: 4,646,971
[45] Date of Patent: Mar. 3, 1987

[54] FIELD SPRAYER AND ENCLOSURE MEMBER THEREFOR

[76] Inventor: Ramon B. Rogers, 1510 Hilliard Street East, Saskatoon, Saskatchewan, Canada, S7J 0G4

[21] Appl. No.: 604,524

[22] Filed: Apr. 27, 1984

[51] Int. Cl.$^4$ .................... A01C 23/00; A01G 25/09; B05B 15/04
[52] U.S. Cl. .................................. 239/166; 47/1.7; 239/172; 239/288.5
[58] Field of Search ..... 239/159, 167, 172, 288–288.5, 239/104, 146, 166; 47/1.7; 296/1 S; 160/332

[56] References Cited

U.S. PATENT DOCUMENTS

| | | | |
|---|---|---|---|
| Re. 22,039 | 2/1942 | Vaage | 239/166 |
| 1,500,857 | 7/1924 | Woodruff | 239/104 |
| 2,286,888 | 6/1942 | Arnold | 239/159 |
| 3,512,714 | 5/1970 | Phelps et al. | 239/159 |
| 3,592,256 | 7/1971 | Knight | 160/332 X |
| 3,807,787 | 4/1974 | Gotz | 296/1 S |
| 4,010,900 | 3/1977 | Flix et al. | 239/172 X |
| 4,147,305 | 4/1979 | Hunt | 239/167 |
| 4,257,471 | 3/1981 | Thurmond, Jr. | 160/332 |
| 4,274,589 | 6/1981 | Jones | 239/167 |
| 4,318,565 | 3/1982 | Lay | 296/1 S |
| 4,353,505 | 10/1982 | Kinder | 239/167 |

FOREIGN PATENT DOCUMENTS

| | | | |
|---|---|---|---|
| 2450057 | 10/1980 | France | 239/172 |
| 759510 | 10/1956 | United Kingdom | 239/105 X |

Primary Examiner—Andres Kashnikow
Attorney, Agent, or Firm—Stanley G. Ade; Adrian D. Battison

[57] ABSTRACT

A field sprayer has a pair of outwardly extending booms each formed by an enclosure having an upper wall of inverted V-shape with an airfoil at the apex for redirecting air rising on one side down the other side to avoid turbulence. The enclosure on the leeside thereof supports a plurality of jet nozzles which project through an opening in the enclosure. A front wall depending downwardly from the front edge is formed of two parallel flexible layers with vertical staggered slits whereby it can flex rearwardly as the enclosure moves forwardly by contacting the plants. The jet is directed to a position immediately behind the rear edge of the front wall in flexed position so as to engage the plants when bent forwardly. Ground wheels are arranged at the outer ends of the booms and a single central pivot supports the inner ends for movement to a trailing transport position.

8 Claims, 5 Drawing Figures

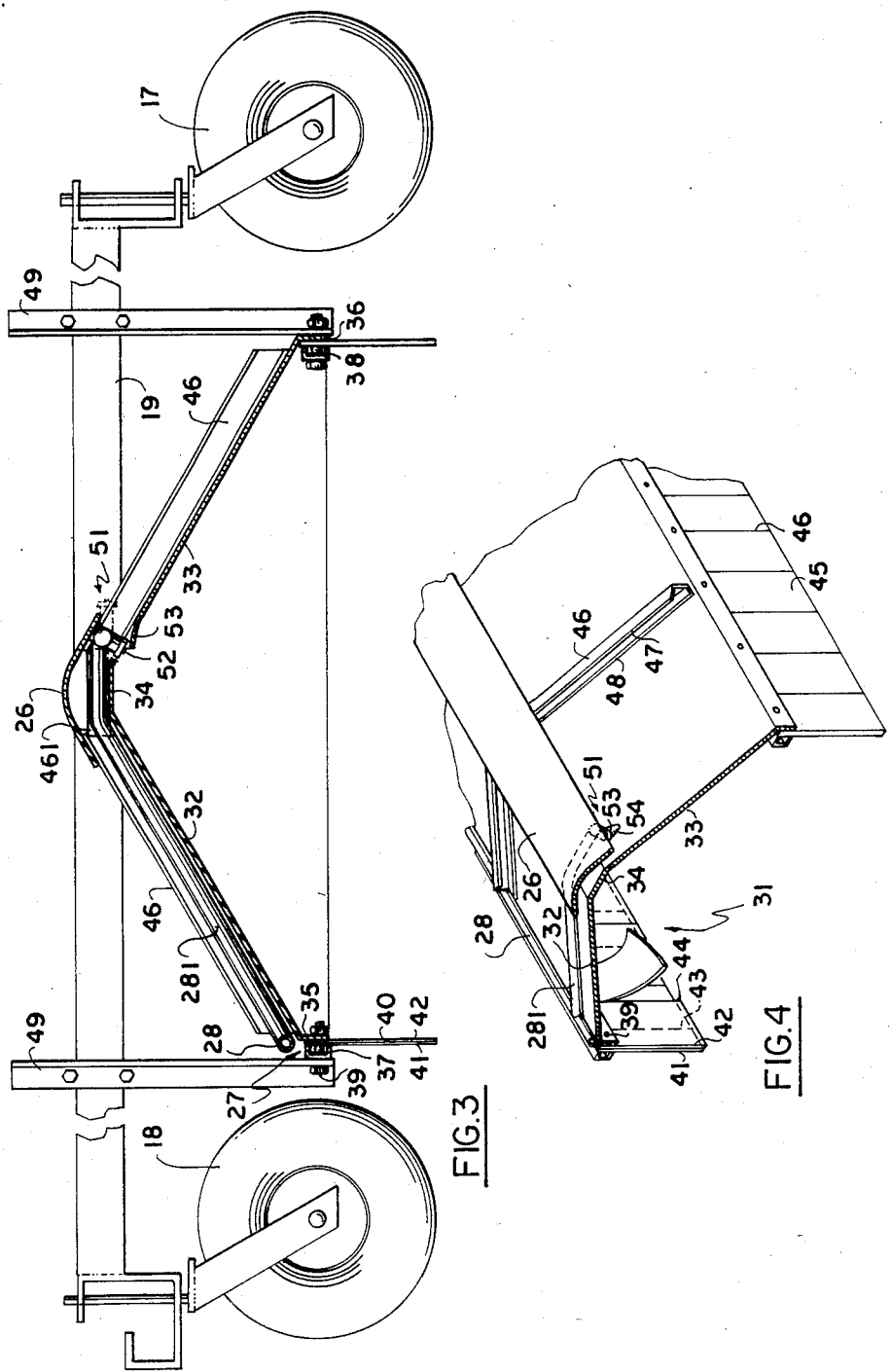

FIELD SPRAYER AND ENCLOSURE MEMBER THEREFOR

BACKGROUND OF THE INVENTION

This invention relates to a field sprayer and particularly to an enclosure member which can effectively surround the nozzles of the field sprayer to improve the spraying action.

Field sprayers are an important item of agricultural equipment for spraying fertilizer and herbicide in liquid form onto the fields or onto a standing crop early in its development. Such sprayers generally comprise a central trailer portion supporting a tank of the fluid and a pair of booms which extend outwardly to each side of the central trailer with a total boom width of generally 60 to 100 feet. It is also known to mount the boom on a sprayer coupe which is self-propelled.

Generally, the boom comprises a framework in the form of a tubular frame which extends outwardly and is supported at one or two positions by ground wheels which control the height of the boom relative to the ground. On the framework is carried a supply pipe which supplies spaced nozzles along the length of the pipe for spraying a curtain of the fluid over the ground as the boom moves forwardly.

All sprayers of this type have generally been, until recently, open to the elements and particularly wind. Recent proposals have been made to provide a flexible cover which can wrap around the framework of the boom and thus enclose the spraying area to reduce the effect of the wind on the spraying action.

The main advantages of such covers have generally been thought to consist in the ability to spray in windy conditions. However, a market has developed for a retrofit arrangement of flexible covers which can be applied to existing sprayer booms of the above type.

Proposals have also been made for specialty type spraying devices of a relatively narrow width which include a cover which extends generally to the ground to fully enclose a spraying area.

However, the attempts to cover such spraying arrangements have been fairly rudimentary and have not been as successful in containing drift as might otherwise have been expected.

SUMMARY OF THE INVENTION

It is one object of the invention therefore to provide an improved enclosure arrangement for field sprayers which enables spraying efficiency to be improved.

According to a first aspect of the invention, therefore, there is provided an enclosure for a field sprayer, the enclosure comprising an elongate cover member for extending over an area to be sprayed and an airfoil arrangement for mounting adjacent the cover member so as to re-direct downwardly to one side of the cover, air rising upwardly from the other side.

According to a second aspect of the invention, there is provided an enclosure for a field sprayer comprising an elongate cover member for extending over an area to be sprayed having an upper wall and a flexible front wall depending downwardly from a front edge of the upper wall, the flexible front wall being formed from a flexible sheet having a plurality of vertical cuts spaced longitudinally of the sheet.

According to a third aspect of the invention, there is provided a field sprayer comprising an elongate cover member for extending over the area of the ground to be sprayed, ground wheels for transporting the cover member in a forward direction transverse to its length over the ground, a plurality of spray nozzles spaced longitudinally of the cover member for spraying fluid onto a horizontal plane over which the cover member is moved, the cover member having an elongate upper wall which has a front portion extending upwardly and rearwardly to the highest point and a rear portion extending rearwardly and downwardly to the elongate rear of the cover member, and a flexible front wall depending downwardly from the front edge of the upper wall toward the ground such that it can flex rearwardly as the cover member moves forwardly, the nozzles being arranged to direct the fluid forwardly so as to intersect the horizontal plane at a position immediately behind the rearwardly flexed position of the front wall.

According to a fourth aspect of the invention there is provided a field sprayer comprising a central support frame having ground wheels for supporting the frame, a pair of booms each extending outwardly from the frame to a respective side thereof, a plurality of spray nozzles mounted on each boom and spaced longitudinally of the boom to provide a curtain of spray across the full width of the sprayer, each boom having a supply pipe connected to a supply tank and extending along the full length of the boom for supplying each nozzle in turn, each boom being supported on ground wheels spaced outwardly of the central frame to guide the boom relative to the ground, each boom being formed by an enclosure cover member including rigid sheet material cover panels, the supply pipe and nozzles being supported relative to the ground substantially solely by said enclosure cover member.

The enclosure for the field sprayer and the enclosed field sprayer have a number of important advantages. Firstly, attention has been given to the air flow in and around the sprayer so that air moving over the top of the enclosure is constrained to flow in a non-turbulent manner up one side of the enclosure, down the other side and re-join air moving across the ground. This avoids turbulence immediately behind the enclosure which can act to lift droplets remaining in the air stream behind the enclosure and thus cause dispersal of small droplets of spray away from the crop or ground.

Secondly, within the enclosure, the direction of spray is arranged along the front of the cover to aim at the ground or the top of the plants at a position adjacent the front of the enclosure and immediately behind the rearwardly flexed position of the front downwardly depending flexible wall. This arrangement positions the spray at the desired position relative to the plants as they are bent forwardly by the front wall and also provided the best air flow within the enclosure. These arrangements, properly controlling the air flows in and around the enclosure, can allow the use of nozzles which provide very small drops of the chemical spray. Very small drops have a better spraying effect if they reach the desired position but are much more dependent upon air flow and thus can be lifted away from the desired position should turbulent flow cause any wind movements which move away from the plants either within the enclosure or more importantly, immediately behind the enclosure.

A further important improvement relates to the fact that, as opposed to the conventional arrangement where the enclosure is provided by a flexible fabric which is draped over the supporting frame and spray nozzles of the boom, the enclosure is designed as an integral part of the boom.

In this regard, it is manufactured from stiff or rigid sheet metal cover plates which effectively provide the total support for the nozzles and the supply pipe. Thus, instead of lifting away the flexible covers to expose the nozzles for service, the covers are rigidly mounted and the nozzles can be positioned on the outer surface of the enclosure at a position which allows the supply pipe and nozzles to be exposed and arranged such that the nozzles can be turned away from the enclosure for service.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 3 is a cross sectional view along the lines 3—3 of FIG. 1 on a larger scale showing the details of the enclosure and nozzle arrangement.

FIG. 4 is an isometric view of the enclosure looking from the section of FIG. 3 and from a position to the rear side of the boom.

In the drawings like characters of reference indicate corresponding parts in the different figures.

DETAILED DESCRIPTION

Figure 1:
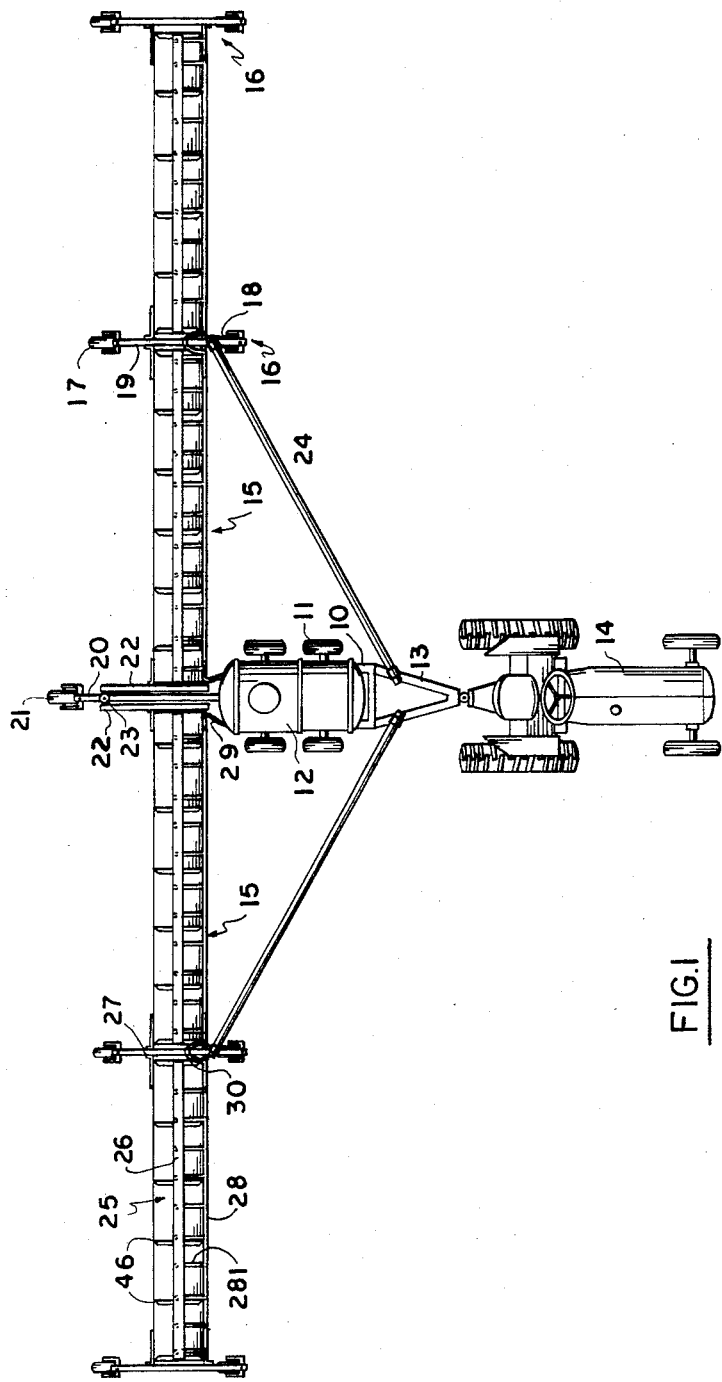
FIG. 1 is a plan view of a field sprayer according to the invention showing the sprayer in working position.

The field sprayer comprises a central trailer section 10 including ground wheels 11 and a supply tank 12 which is of known construction. The trailer 10 includes a hitch 13 for attachment to a tractor 14 by which it can be towed across an area to be sprayed in a working position or in a transport position described hereinafter.

A pair of booms 15 extend from a position rearward of the trailer out to respective sides of the trailer to produce a working width of boom transverse to the trailer from which fluid can be sprayed to the ground. As in conventional arrangements, the booms can be manufactured of various lengths to provide a total working width of the order of 10 to 100 feet, depending upon requirements.

As shown, each of the booms is supported at its end by a ground wheel arrangement 16 and also by a similar ground wheel arrangement also indicated at 16 at a position mid-way along the length of the boom.

The ground wheel arrangement 16 is shown also in FIG. 3 and is itself of known construction comprising a pair of castor wheels 17, 18 mounted upon a support beam 19 which extends forwardly of the boom so that in the working position shown in FIG. 1, the wheels lie parallel to the support beam 19.

The inner end of each of the booms 15 is supported upon a rearwardly extending arm 20, the rearward end of which is supported upon a ground wheel 21 which is castored similar to the wheels 17. Each boom 15 is supported upon the support arm 20 by a connecting bracket or strut 22 which extends from the rear corner of the boom to a pivot mounting 23 to which both of the brackets 22 are coupled.

The booms 15 are maintained in the working position, that is transverse to the direction of motion of the trailer 10, by a pair of radius arms 24 which extend from the inner support beam 19 of the ground wheel arrangement 16 to a position on the hitch 13. The coupling to the hitch 13 is releaseable by a conventional arrangement so that, when released, the booms 15 are free to pivot about the pivot coupling 23 to take up the position illustrated in FIG. 2 which is the transport position. In this position, the radius rods 24 are stored by latching onto the side of the respective boom and thus the only interconnection between the booms 15 and the trailer 10 is provided by the pivot coupling 23 and the brackets 22.

It will be appreciated that in the transport position the wheels 17 and 18 castor to a direction at right angles to the support bars 19 so as to transport the booms in the direction of transport. The length of the brackets 22 is arranged to be sufficient so that as the booms directly follow the trailer, the inner wheels 17 of the wheel arrangements 16 are spaced sufficiently to avoid damaging contact. In view of the fact that the booms fold about the pivot coupling 23, which is a single coupling, they also turn about this coupling during turning movements in transport and this prevents relative movement between each side of the boom during such turning movements.

Thus, the booms 15 can follow the trailer and particularly the pivot coupling 23 and without any other interconnection can avoid, running into each other during such movement.

Reverting to FIG. 1, it will be noted that each boom includes a pair of elongate enclosures generally indicated at 25 which extend from the inner end adjacent the trailer to the outer end of the boom, the construction of which will be described hereinafter. In addition an airfoil 26 is mounted on top of the enclosure 25 again in a position described hereinafter. The airfoil and enclosures extend from the inner end to the inner ground wheel arrangement 16 at which there is provided a hinge coupling indicated at 27. From that point, they extend to the outer end of the boom and thus effectively along the full length of the enclosure 25.

Along the front edge of the cover is provided a feed tube 28 which again extends along the full length of the boom from a supply line 29 connected to the tank 12. The tube 28 is formed in two sections again split at the inner wheel arrangement 16 and coupled by a flexible section 30. The single feed tube 28 supplies the nozzles which are arranged at spaced relation along the length of the tube 28 by branch tubes 281 arranged at right angles to the length of the boom.

Turning now to the structural details of the booms as shown in very much enlarged views in FIGS. 3 and 4, they are of constant cross section as illustrated. Specifically, each boom section comprises an enclosure formed by an upper wall 31 which has a front section 32 and a rear section 33, both of which are inclined from front and rear edges respectively to a top surface 34 which is horizontal and narrow relative to the width of the upper wall 31. The angle of inclination is of the order of 45°. At the lowermost edge each of the sections 32, 33 is turned downwardly to form a vertical flange 35, 36 for attachment to front and rear walls respectively.

The upper wall 31 is formed from rigid sheet metal material which can be bent into shape as shown and formed either from a single piece or effectively the front and rear sections 32, 33 can be formed from separate pieces interconnected by an overlying layer forming the top section 34. The width of the enclosure is, in one example, of the order of 30 inches.

The upper wall 31 is effectively self-supporting but can be stiffened longitudinally by longitudinal channel clamps 37, 38. The open base of the channels 37, 38 is clamped to the flange 35, 36 by a plurality of bolts 39 spaced longitudinally of the flanges. These channels 37, 38 provide stiffening of the flanges 35, 36 to give lateral stiffness to the upper wall, that is to increase its resistance to bending movement about a vertical axis passing through one of the flanges 35, 36.

A front wall 40 is formed in two layers from a flexible plastic material such as polyethylene or other fabric which is resistant to chemicals and also has a good wear resistance in view of its contact with the ground or with plants. The wall thus comprises a front layer 41 and a rear layer 42 which are in contact and lie directly parallel and co-extensive, clamped together by the flange 35 and the channel 37.

Each of the layers 41, 42 has a plurality of equally spaced vertical slits or cuts formed in the full height of the layer, the slits in the front layer in FIG. 4 being illustrated in dashed line. It will be noted that the slits 43 in the front layer 41 are offset relative to the slits 44 in the rear layer by a distance less than the spacing between the slits.

The wall thus formed has slits which are sufficiently frequent to allow it to flex over plants and obstacles while being sufficiently stiff to bend crop to induce movement in the crop that ensures complete coverage of each plant with chemical without injuring the plant. At the same time the staggered slits allow the required flexibility while preventing the sprayed chemical from escaping between the two layers. Thus, in order to escape each drop needs to make a 90° turn to pass from inside the inner layer between the layers and then out of the front layer. Any fluid which does happen to escape, escapes by seepage rather than movement within an airflow and therefore can run down the front face of the layer 41 and be wiped over the crop contacting the front face as shown in FIG. 5.

The downwardly depending rear wall indicated at 45 comprises a single layer of the flexible fabric including slots 46 similar to those of the front wall. The height of the front and rear walls is the same and can be of the order of eight inches which is sufficient to provide the required flexibility at the crop height at which spraying normally takes place.

The airfoil 26 extends over the upper apex of the upper wall 31 and is symmetrical relative thereto, that is, a first section thereof lies parallel to the front section 32, the rear section thereof lies parallel to the rear portion 33 and an upper section thereof extends over the wall 34. To provide the required air flow characteristics, the airfoil is preferably curved through its upper portion either as a smooth curve or as a number of straight sections bent relative to one another through the curve. The spacing between the undersurface of the airfoil and the upper surface of the wall 31 is preferably of the order of three inches, but it can lie in the range two inches to six inches.

In addition, the spacing between the rear edge of the airfoil and the adjacent rear cover panel can be reduced relative to the spacing between the front edge and the front cover panel to increase the velocity of air as it passes under the airfoil.

The airfoil is mounted relative to the upper wall 31 by a number of spars 46. Each of these comprises a plate with right angled flanges along each side, the flanges shown in FIG. 4 at 47 and 48 respectively, the former being attached to the undersurface of the airfoil 26 and the latter being attached to the outer surface of the upper wall section 32 or 33.

Thus, as shown in FIG. 3, two such spars 46 are positioned on either side of the airfoil supporting the front and rear sections of it relative to the upper wall. The two spars are tied together at the top end by a plate 461. As shown in FIG. 1, there are a number of such spars 46 positioned in spaced relation along the length of the airfoil.

Not only do the spars 46 support the airfoil, they also, in combination with the airfoil and tying plate 461, provide vertical stiffness to the upper wall so as to prevent the cover flattening by spreading of the front and rear edges of the cover and so as to prevent bending movement about a horizontal axis passing through the wall 34. The upper wall 31 is therefore laterally and vertically stiffened by the channels and by the spars and airfoil, but is flexible in rotation about an axis along its length, allowing it to follow the ground while travelling over uneven terrain, for example, formed by coulees.

The boom sections are therefore effectively formed by the enclosure or cover member and particularly the upper wall thereof, and this provides effectively the whole strength of each of the booms without the necessity for further framework.

Each section of the pipe 28 is supported on the front section 32 at a position adjacent the front edge thereof at a position in front of the spars 46. Each section 28 carries a plurality of rearwardly extending branch pipes 281 each leading to a respective nozzle, one of which is generally indicated in FIGS. 3 and 4 at 51, the nozzles being of conventional construction and attached to the pipe section 281 so as to extend therefrom to a jet 52 from which the fluid in the pipe 28 is ejected in a fan.

The pipe 28 is first positioned such that it interferes as little as possible with the air from over the cover while being accessible on the outer sur face rather than hidden within the cover. The branch pipes 281 extend directly rearwardly and hence interfere very little with air moving rearwardly over the cover.

The nozzle in a working position projects through the airfoil with the jet 52 projecting into an opening 53 in the rear wall section 33. The opening 53 is at the bottom of an indentation 54 so that there is no possibility of the fluid exiting from the jet being influenced by air streams passing over the surface 33 or of the fluid failing to enter within the opening 53 into the interior of the enclosure defined by the upper wall 31.

The indentation 54 is elongate so as to allow the nozzle 51 to be removed from the bracket into a position in which it is exposed from the outer surface of the airfoil 26 as shown in phantom in FIG. 3. To allow this movement there is provided a slot 55 in the airfoil 26 at the position of the nozzle. The nozzle can thus be exposed for cleaning merely by removing the nozzle without the removal of any covers or the movement of any covers. The nozzle can, of course, be changed for a different type of nozzle depending upon the spray requirements at the time of use, but the structure of the nozzles is of conventional arrangement and therefore will not be described in detail here.

Figures 2, 5:
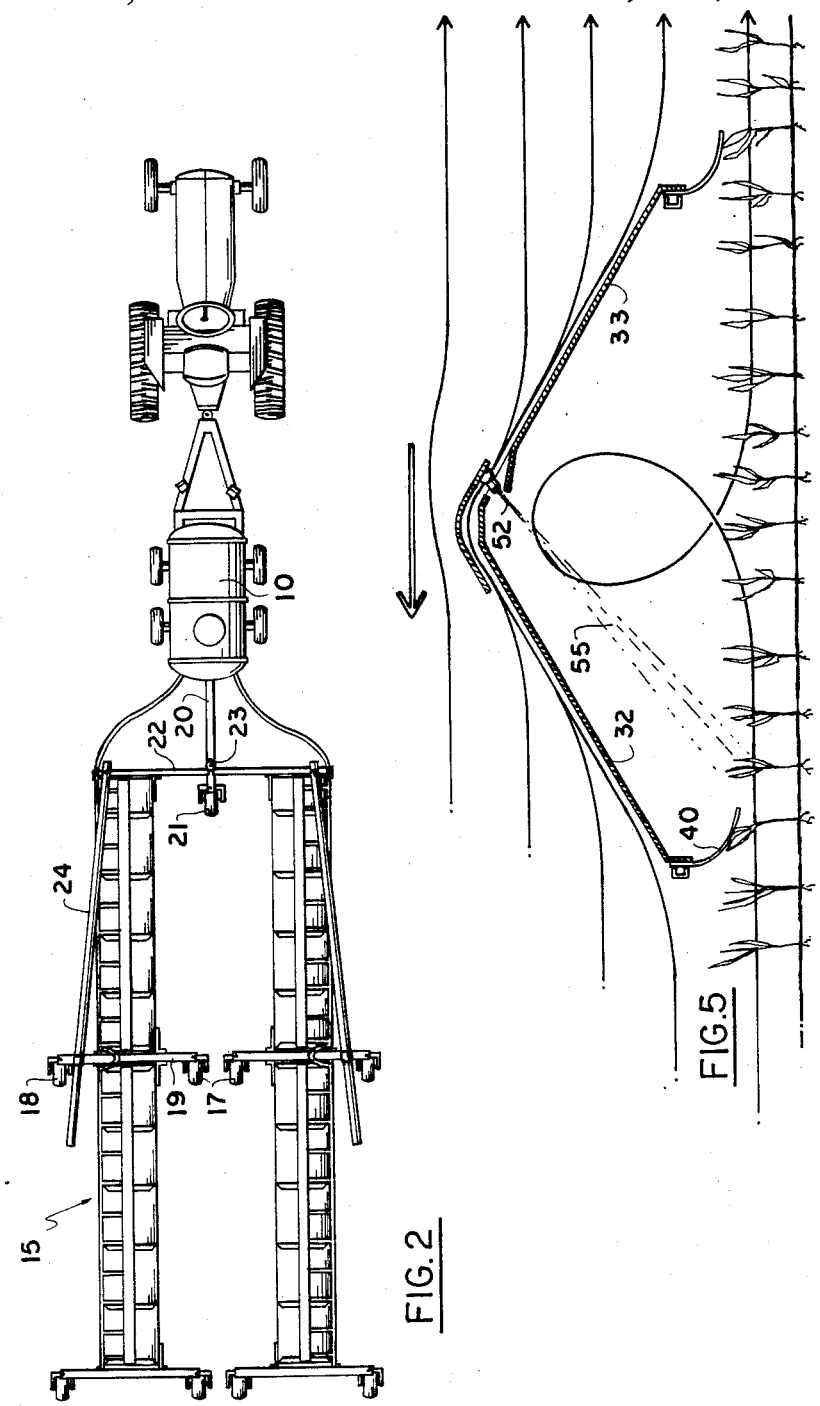
FIG. 2 is a plan view of the sprayer of FIG. 1 showing the arrangement in transport position with the booms trailing rearwardly of the central trailer section.
FIG. 5 is a schematic view similar to that of FIG. 3 showing the air spray and crop movements in use.

As shown in FIG. 5, the direction of the jet 52 is arranged such that the fan provided thereby lies in a plane projecting generally along the front wall section 32, that is within the forward area of the enclosure from the top part of the rear wall section 33.

The actual direction of the plane indicated at 55 is such that it lies immediately behind the end of the front wall 40 in its flexed position caused by the forward movement of the implement and the contact of the front wall 40 with the plants or with the ground on which spraying is taking place. This flexed position is shown in FIG. 5 where the wall 40 flexes rearwardly while at the same time depressing slightly the plants standing from the ground. The spray along the axis 55 thus contacts the plants while they are bent forwardly so that it can enter between the plants and ensure that they are fully coated.

The airflow lines are shown schematically in FIG. 5 where it will be noted that air engaging the front part of the upper wall moves upwardly along the upper wall and then is turned over the apex at the top of the upper wall to run down the rear section 33. This produces smooth flow of the air which can then return to its normal field pattern rearwardly of the spray enclosure. At the same time air contacting the front wall 40 or below the front wall 40 tends to run under the enclosure and to swirl around within the enclosure escaping again in a smooth manner along the ground to join with the air passing over the top of the enclosure. In this way, turbulence is avoided maintaining the smooth flow of air over the ground and avoiding air movement in an upward direction behind the enclosure which can act to lift spray away from the intended area.

Within the enclosure, the forward direction of the jet along the plane 55 creates a swirl of the air or assists in that swirl within the enclosure which improves the coverage efficiency of the spray.

The arrangement shown allows the use of nozzles providing very small droplets of the fluid whereby application rates as low as one gallon per acre up to forty gallons per acre can be achieved with 50 to 400 micron drops.

The enclosure forming the booms therefore improves spraying efficiency not only in conditions of high wind where spraying would not otherwise be possible but also under normal spraying conditions where movement of the air is caused by forward movement of the implement over the ground. For these reasons, the enclosure is a permanent structure forming the framework for the boom and cannot be removed.

The upright 49 adjacent the hinge 27 (FIG. 3) attached to the wheel assembly is attached rigidly to the channel 39 of the inner section of each boom. The inner end of the outer section is coupled to the upright by pivot bolts which allow the outer section to pivot relative to the inner section about a horizontal axis. It will be appreciated that if a third section is added, it also is pivoted in a similar manner to the outer end of the second section.

The ground wheels of the second or outermost section are arranged directly at the end of the section and thus properly support the end without any overhang or cantilever section. Thus, the end is properly controlled in its height relative to the ground and furthermore, the outermost ground wheels can be used as a ground marker for the end of the boom and as a follower on the next path of the boom over the field.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An enclosure for a field sprayer of the type having a plurality of nozzles spaced longitudinally of the sprayer for directing onto the ground over an area beneath the nozzles and mounted on ground wheels for moving forwardly over the ground in a direction transverse to its length, the enclosure comprising an elongate cover member for extending over the nozzles from a position forwardly thereof and adjacent the ground to a position rearwardly thereof an adjacent the ground so as to include said area to be sprayed said cover member having an upper wall formed from a front portion extending upwardly and rearwardly to a highest point of the upper wall and a rear portion extending downwardly and rearwardly from the highest point, and an airfoil arrangement adjacent the cover member at the highest point, said upper wall and air guide surface being shaped and arranged such that air passing upwardly along said front portion towards said highest point is re-directed downwardly to pass along said rear portion toward the ground.

2. The invention according to claim 1 wherein the air foil arrangement is spaced from and lies substantially parallel to the upper wall.

3. The invention according to claim 1 wherein the air foil arrangement is curved in a direction from one side to the other of the cover member.

4. The invention according to claim 1 wherein the front and rear portions of the upper wall are planar.

5. The invention according to claim 1 wherein a rear portion of the air foil arrangement is spaced from the rear portion of the cover member by a distance less than the spacing of a front portion thereof from the front portion of the cover member.

6. The invention according to claim 1 wherein the air foil arrangement is supported relative to the upper wall by planar support fins extending vertically upwardly from the upper wall and transverse to the length thereof.

7. The invention according to claim 1 wherein the cover member provides a closed upper surface.

8. A field sprayer comprising a central support frame having ground wheels for supporting the frame, a pair of boom each being movable from a working position in which the booms extend outwardly from the frame to a respective side thereof to a transport position in which the booms trail rearwardly of the central frame, a plurality of spray nozzles mounted on each boom and spaced longitudinally of the boom to provide a curtain of spray across the full width of the sprayer, each boom being supported on ground wheels spaced outwardly of the central frame to guide the boom relative to the ground, a central pivot member carried by said central frame and providing a single vertical pivot axis and each boom including a respective strut means arranged to extend outwardly to one side of the respective boom so as to interconnect the boom to the central pivot member for pivotal movement about said single vertical axis from said working position in which said strut means retains the boom in a position forwardly of the single vertical axis to said transport position in which strut means retains the boom in a position spaced outwardly of the single vertical axis.

* * * * *